(12) United States Patent
Fujimoto et al.

(10) Patent No.: US 11,898,650 B2
(45) Date of Patent: Feb. 13, 2024

(54) PRESSURE-REDUCING VALVE, VALVE UNIT, VALVE DEVICE, AND LEAF SPRING

(71) Applicant: KAWASAKI JUKOGYO KABUSHIKI KAISHA, Kobe (JP)

(72) Inventors: Yoshiteru Fujimoto, Kobe (JP);
Masayoshi Okamoto, Kobe (JP);
Masataka Higashiura, Kobe (JP);
Masataka Shirasawa, Kobe (JP);
Tsutomu Tomita, Kobe (JP);
Shigeyoshi Mori, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/759,496

(22) PCT Filed: Jan. 15, 2021

(86) PCT No.: PCT/JP2021/001245
§ 371 (c)(1),
(2) Date: Jul. 26, 2022

(87) PCT Pub. No.: WO2021/153272
PCT Pub. Date: Aug. 5, 2021

(65) Prior Publication Data
US 2023/0055857 A1    Feb. 23, 2023

(30) Foreign Application Priority Data

Jan. 31, 2020  (JP) .................................. 2020-015831

(51) Int. Cl.
*F16K 17/30*     (2006.01)
*F16K 25/00*     (2006.01)
(Continued)

(52) U.S. Cl.
CPC ............ *F16K 17/30* (2013.01); *F16K 25/005* (2013.01); *F16K 27/0263* (2013.01); *G05D 16/06* (2013.01); *G05D 16/10* (2013.01)

(58) Field of Classification Search
CPC .... F16K 25/005; F16K 27/0263; F16K 17/30; G05D 16/06; G05D 16/10; F16F 1/027; F16F 1/18
See application file for complete search history.

(56) References Cited

U.S. PATENT DOCUMENTS 4,226,257 A * 10/1980 Trinkwalder ............ A62B 9/02
                                                    137/514.7
4,732,362 A *  3/1988 Morioka ............. F16K 31/0655
                                                    251/129.17
(Continued)

FOREIGN PATENT DOCUMENTS

JP    S287358 Y1    8/1953
JP    H1146076 U1   10/1989
(Continued)

OTHER PUBLICATIONS

ISA Japan Patent Office, International Search Report Issued in Application No. PCT/JP2021/001245, dated Apr. 6, 2021, WIPO, 6 pages.
(Continued)

*Primary Examiner* — Jessica Cahill
(74) *Attorney, Agent, or Firm* — Alleman Hall & Tuttle LLP

(57) ABSTRACT

This pressure-reducing valve includes: a casing in which a valve passage is formed; a valve body that is movably housed in the casing and changes a position thereof according to a secondary pressure to adjust an opening degree of the valve passage; and a biasing member that biases the valve body against the secondary pressure in an opening direction in which the valve passage opens. The biasing
(Continued)

member is a spring in the form of a plate and extends laterally from the valve body.

9 Claims, 4 Drawing Sheets

(51) Int. Cl.
    *F16K 27/02*     (2006.01)
    *G05D 16/06*     (2006.01)
    *G05D 16/10*     (2006.01)

(56) References Cited

U.S. PATENT DOCUMENTS

| | | | |
|---|---|---|---|
| 8,342,201 B2* | 1/2013 | Nitta | G05D 16/0669 137/505.11 |
| 2007/0239042 A1* | 10/2007 | Takahashi | H01F 7/14 600/490 |
| 2013/0263942 A1* | 10/2013 | Ninomiya | F16K 17/30 137/505 |
| 2014/0076429 A1* | 3/2014 | Masui | F16K 17/04 137/535 |
| 2015/0369378 A1* | 12/2015 | Umeyama | G05D 7/0635 137/486 |
| 2016/0124439 A1* | 5/2016 | Yasuda | G05D 7/01 137/505 |

FOREIGN PATENT DOCUMENTS

| | | | | |
|---|---|---|---|---|
| JP | 201019353 A | | 1/2010 | |
| JP | 201293809 A | | 5/2012 | |
| WO | WO-2006004286 A1 | * | 1/2006 | F16F 1/027 |

OTHER PUBLICATIONS

ISA Japan Patent Office, Written Opinion of the International Searching Authority Issued in Application No. PCT/JP2021/001245, dated Apr. 6, 2021, WIPO, 10 pages.

* cited by examiner

PRESSURE-REDUCING VALVE, VALVE UNIT, VALVE DEVICE, AND LEAF SPRING

TECHNICAL FIELD

The present invention relates to a pressure-reducing valve that reduces the pressure of gas and outputs the gas, a valve unit, a valve device, and a leaf spring that biases a valve body.

BACKGROUND ART

A known example of a pressure-reducing valve related to gas such as compressed natural gas and hydrogen gas is the pressure-reducing valve disclosed in Patent Literature (PTL) 1. In the pressure-reducing valve disclosed in PTL 1, a secondary pressure acts on a valve body in a closing direction, and the valve body is biased by a helical compression spring so that the valve body acts against the secondary pressure.

CITATION LIST

Patent Literature

PTL 1: Japanese Laid-Open Patent Application Publication No. 2012-093809

SUMMARY OF INVENTION

Technical Problem

In the pressure-reducing valve disclosed in PTL 1, since the valve body is biased by the helical compression spring in the opening direction, the pressure-reducing valve is large in size, especially, in axial length.

Thus, the present invention has an object to provide a pressure-reducing valve, a valve unit, a valve device, and a spring member that can be downsized.

Solution to Problem

A pressure-reducing valve that is the first invention includes: a casing in which a valve passage is formed; a valve body that is movably housed in the casing and changes a position thereof according to a secondary pressure to adjust an opening degree of the valve passage; and a biasing member that biases the valve body against the secondary pressure in an opening direction in which the valve passage opens. The biasing member is a spring in the form of a plate and extends laterally from the valve body.

According to the first invention, since a spring in the form of a plate extending laterally from the valve body is used as the biasing member, the axial length of the pressure-reducing valve can be reduced; in other words, the pressure-reducing valve can be downsized.

A valve unit that is the second invention includes: the aforementioned pressure-reducing valve; and a relief valve that relieves a secondary pressure of the pressure-reducing valve. In the pressure-reducing valve, an atmosphere chamber isolated from the secondary chamber and the valve passage is formed on an opposite side of the biasing member from the secondary chamber in the casing. The atmosphere chamber is exposed to an atmosphere via a secondary-side passage of the relief valve.

According to the second invention, even when the biasing member deforms and the volume of the atmosphere chamber changes or when gas leaks into the atmosphere chamber, the atmosphere chamber can be maintained at the atmospheric pressure. Furthermore, when the secondary pressure exceeds a set pressure and the relief valve is actuated, a relief pressure which is the pressure on the secondary side can be brought to the atmosphere chamber. This makes it possible to exert the relief pressure on the biasing member against the secondary pressure. Thus, it is possible to reduce load that acts on the biasing member when the relief valve is actuated.

A valve device that is the third invention includes: a casing in which a valve passage is formed; a valve body that is movably housed in the casing and changes an opening degree of the valve passage according to a force acting thereon; and a biasing member that biases the valve body against the force acting on the valve body. The biasing member is a spring in the form of a plate and extends laterally from the valve body.

According to the third invention, since a spring in the form of a plate extending laterally from the valve body is used as the biasing member, the axial length of the valve device can be reduced; in other words, the valve device can be downsized.

A leaf spring that is the fourth invention is a leaf spring for biasing a valve body in one direction and includes: an inner portion to which the valve body is attached; an outer edge portion to be supported; and a tapered part that is tapered in shape and connects the inner portion and the outer edge portion.

According to the fourth invention, it is possible to smoothly bias the valve body while minimizing the height of the leaf spring. At the time when the leaf spring bends, the tapered part is elastically deformed while changing the relative angle between an outer edge side portion and a center side portion, and a center portion moves parallel to the axis. Thus, it is possible to control the inclination of the valve body attached to the center portion.

Advantageous Effects of Invention

According to the present invention, downsizing can be accomplished.

The above object, other objects, features, and advantages of the present invention will be made clear by the following detailed explanation of preferred embodiments with reference to the attached drawings.

DESCRIPTION OF EMBODIMENTS

Hereinafter, a pressure-reducing valve 1, a valve unit 2, and a leaf spring 12 according to an embodiment of the present invention will be described with reference to the aforementioned drawings. Note that the concept of directions mentioned in the following description is used for the sake of explanation; the orientations, etc., of elements according to the present invention are not limited to these directions. Each of the pressure-reducing valve 1 and the leaf spring 12 described below is merely one embodiment of the present invention. Thus, the present invention is not limited to the following embodiment and may be subject to addition, deletion, and alteration within the scope of the essence of the present invention.

Figure 1:
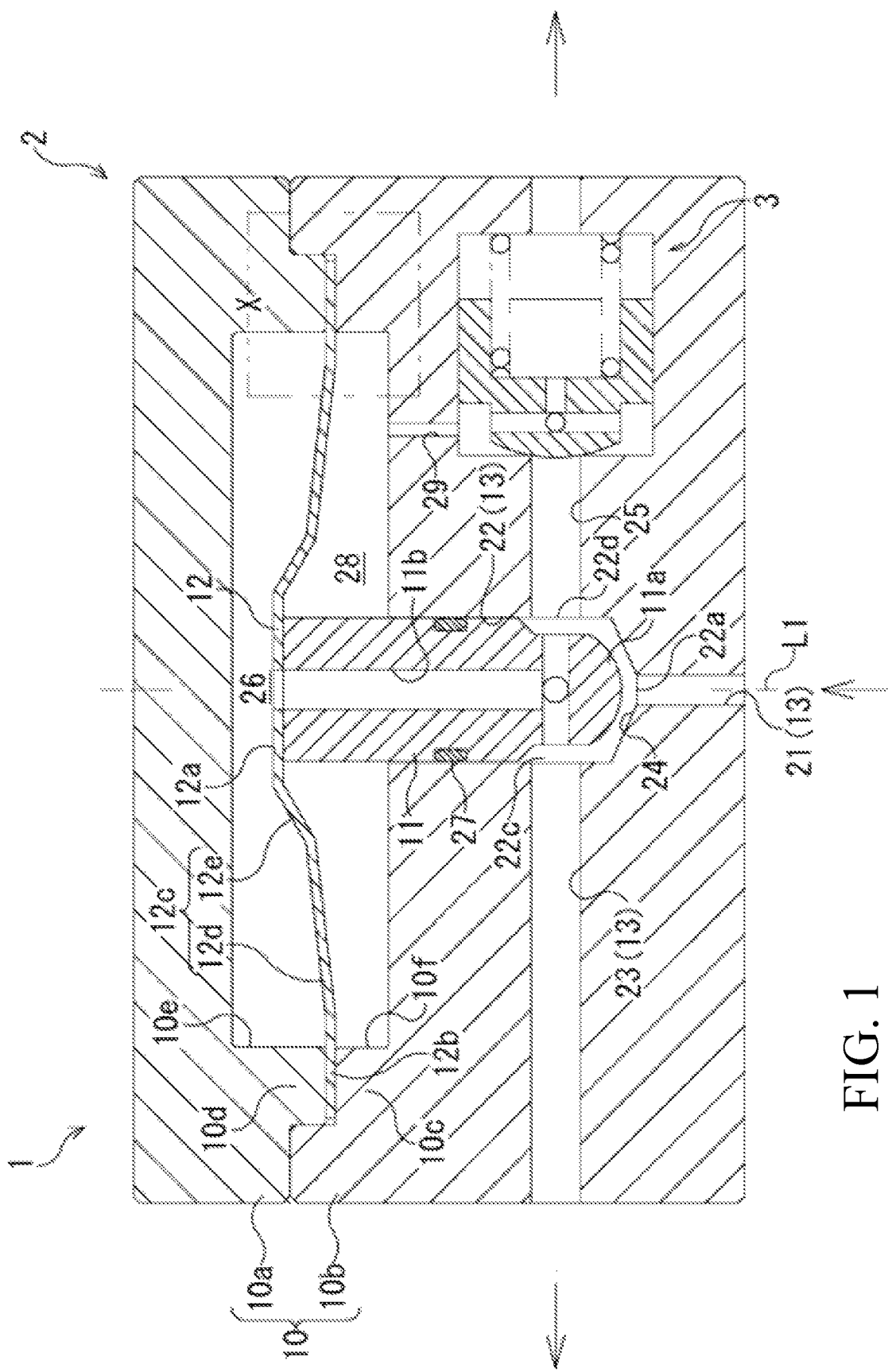
FIG. 1 is a cross-sectional view illustrating a pressure-reducing valve according to an embodiment of the present invention.

The valve unit 2 illustrated in FIG. 1 is used to reduce the pressure of gas such as compressed natural gas and hydrogen gas to the working pressure, the atmosphere pressure, or the like. The valve unit 2 includes the pressure-reducing valve 1 and a relief valve 3, for example. The pressure-reducing valve 1 includes a function of reducing the pressure of gas such as compressed natural gas and hydrogen gas to the working pressure, the atmosphere pressure, or the like. The pressure-reducing valve 1 includes a casing 10, a valve body 11, and the leaf spring 12.

The casing 10 includes a valve passage 13 and a secondary chamber 26 therein. More specifically, the casing 10 includes a cover part 10a and a housing block part 10b. In the present embodiment, the valve passage 13 is formed in the housing block part 10b. The valve passage 13 includes a primary-side passage 21, a valve chamber 22, and a secondary-side passage 23. The valve body 11 is inserted into the valve chamber 22 in order to adjust the opening degree of the primary-side passage 21 (in other words, the opening degree of the valve passage 13). In the valve passage 13, gas input to the primary-side passage 21 is output to the secondary-side passage 23 via the valve chamber 22.

More specifically, the primary-side passage 21 and the valve chamber 22 are both formed along a predetermined axial line L1 and are connected to each other. In other words, the primary-side passage 21 is connected to the bottom of the valve chamber 22. Furthermore, the secondary-side passage 23 is connected to the inner peripheral surface of the valve chamber 22. The secondary-side passage 23 extends in a direction crossing the axial line L1. In the present embodiment, the secondary-side passage 23 extends in a direction orthogonal to the axial line L1.

The valve body 11 is a circular cylindrical member formed of resin. A sealing member 27 is disposed between the outer peripheral surface of the valve body 11 and the inner peripheral surface of the valve chamber 22 (specifically, the housing block part 10b). The valve body 11 sealed by the sealing member 27 is movably housed in the valve chamber 22. In other words, the valve body 11 can move towards and away from the primary-side passage 21 along the axial line L1. Furthermore, a valve seat part 24 is formed in the housing block part 10b. The valve seat part 24 is formed around an opening 22a of the valve chamber 22 on the primary-side passage 21 side. When a leading end part 11a of the valve body 11 is seated on the valve seat part 24, the primary-side passage 21 is closed. The primary-side passage 21 can be opened by moving the valve body 11 away from the valve seat part 24. Accordingly, the primary-side passage 21 and the secondary-side passage 23 are connected via an annular passage 22c located around a leading end portion of the valve body 11. Thus, the valve passage 13 is opened by moving the valve body 11 one axial direction (namely, an opening direction) along the axial line L1. Furthermore, in the pressure-reducing valve 1, the valve passage 13 is closed by moving the valve body 11 in the other axial direction (namely, a closing direction) along the axial line L1.

The leaf spring 12 is attached to the valve body 11. The leaf spring 12 can generate a restoring force corresponding to displacement. Furthermore, the leaf spring 12 moves the valve body 11 with the generated restoring force. In the present embodiment, the leaf spring 12 is used instead of the helical compression spring. The leaf spring 12, which is the biasing member, biases the valve body 11 in the opening direction. More specifically, the leaf spring 12 is a metal member in the form of a plate (in the present embodiment, a member made of an alloy or a stainless steel (SUS) such as SUS304CSP). The leaf spring 12 is formed in the shape of a circular disc when viewed in plan. The leaf spring 12 has a center portion 12a formed so as to have a cross-section rising in the one axial direction. The center portion 12a of the leaf spring 12 is formed to be flat with a diameter greater than the outer diameter of the valve body 11.

The base end surface of the valve body 11 is attached to the leaf spring 12. In the present embodiment, the base end surface of the valve body 11 is bonded to a surface of the center portion 12a that is located in the other axial direction. When the base end surface of the valve body 11 is attached to the leaf spring 12, the valve body 11 and the leaf spring 12 can be bonded together over a large surface area.

Note that examples of the attachment method includes a method in which surface treatment is applied to the surface located in the other axial direction and the valve body 11 made of synthetic resin such as polyether ether ketone (PEEK), polyphenylene sulfide (PPS), polyimide (PI), and polyamide-imide (PAI) is formed by resin molding on said surface so that these are bonded together. Examples of the surface treatment includes chemical treatment and physical treatment involving laser irradiation. Other conceivable examples of the attachment method include attachment using a snap-fit, an adhesive, an adhesive tape, and a bush and attachment by way of chemical bonding, outsert molding, and the like. In these examples of the attachment method, it is preferred that the seal between the valve body 11 and the leaf spring 12 be ensured using a sealing member or the like.

The leaf spring 12 is fixed to the casing 10. In the present embodiment, the leaf spring 12 is fixed to the casing 10 by being sandwiched between the cover part 10a and the housing block part 10b. More specifically, an outer edge portion 12b of the leaf spring 12 is formed to be flat. This outer edge portion 12b is fixed to the casing 10. In other words, the outer edge portion 12b is sandwiched between the cover part 10a and the housing block part 10b.

The outer edge of the leaf spring 12 is placed on the housing block part 10b. A step part 10c is formed in the housing block part 10b so as to fit with the outer edge of the outer edge portion 12b (in other words, the outer edge of the leaf spring 12). More specifically, the valve chamber 22 is formed on one end surface of the housing block part 10b along the axial line L1. The step part 10c having a diameter greater than the diameter of the leaf spring 12 is formed on one end surface of the housing block part 10b. The leaf spring 12 is disposed so that the outer edge thereof is placed on the step part 10c. Furthermore, one end surface of the housing block part 10b is covered by the cover part 10a. An annular protruding part 10d, which is in the form of a circular ring and fits with the step part 10c, is formed on the cover part 10a. When the annular protruding part 10d fits on the step part 10c, the outer edge is sandwiched between the step part 10c and the annular protruding part 10d. Note that the step part 10c and the annular protruding part 10d do not necessarily need to be provided and may be omitted. Furthermore, the step part 10c does not necessarily need to be formed on the housing block part 10b and may be formed on the cover part 10a. In this case, the annular protruding part 10d is formed on the housing block part 10b. The cover part 10a and the housing block part 10b are fastened together using two or more fasteners that are bolts in the present embodiment, and the outer edge of the leaf spring 12 is sandwiched with the fastening force of the bolts. Note that the cover part 10a and the housing block part 10b do not necessarily need to be fixed using the fasteners and may be screwed to each other.

Furthermore, in the casing 10, the secondary chamber 26 is formed in the one axial direction from the leaf spring 12. Moreover, an atmosphere chamber 28 is formed on the opposite side of the leaf spring 12 from the secondary chamber 26, in other words, in the other axial direction from the leaf spring 12. In the present embodiment, the secondary chamber 26 is enclosed by the cover part 10a and the leaf spring 12. More specifically, in the cover part 10a, a recess 10e is formed inward of the annular protruding part 10d. The space enclosed by the recess 10e and the leaf spring 12 forms the secondary chamber 26. The atmosphere chamber 28 is enclosed by the housing block part 10b and the leaf spring 12. More specifically, in the housing block part 10b, a recess 10f is formed inward of the step part 10c. The space enclosed by the recess 10f and the leaf spring 12 forms the atmosphere chamber 28.

The secondary chamber 26 is a chamber to which a secondary pressure is brought in order to exert the secondary pressure on the valve body 11. The secondary chamber 26 is covered by the leaf spring 12. Therefore, the leaf spring 12 isolates the secondary chamber 26 from the atmosphere chamber 28. In other words, when the outer edge of the leaf spring 12 is sandwiched between the step part 10c and the annular protruding part 10d, a metal seal is formed between the step part 10c and the annular protruding part 10d. With this, the secondary chamber 26 is isolated from the atmosphere chamber 28. Furthermore, a communication path 11b is formed in the valve body 11. The communication path 11b connects the annular passage 22c and the secondary chamber 26. Therefore, the secondary pressure is brought to the secondary chamber 26 through the communication path 11b. Furthermore, the leaf spring 12 can receive the secondary pressure brought to the secondary chamber 26. This means that the secondary pressure can be exerted on the valve body 11 via the leaf spring 12 in the closing direction.

The leaf spring 12 is formed to protrude in the one axial direction (one direction), that is, in the opening direction, as mentioned earlier. Therefore, when the valve body 11 moves in the other axial line, that is, in the closing direction, the valve body 11 is biased in the opening direction for elastic recovery. Thus, the valve body 11 receives, from the leaf spring 12, the biasing force acting against the aforementioned secondary pressure. Furthermore, the primary pressure in the primary-side passage 21 and the secondary pressure in the annular passage 22c act on the valve body 11 in the opening direction. Therefore, the valve body 11 moves to a position at which the received primary pressure, the received secondary pressure, and the received biasing force are balanced. Thus, by moving to the position corresponding to the secondary pressure, the valve body 11 adjusts the opening degree of the valve passage 13 and maintains the secondary pressure at a predetermined pressure. With the leaf spring 12 having such a function, because the leaf spring 12 is a circular disc member protruding in the opening direction, the height of the spring can be less than that in the case where the helical compression spring is used. Therefore, it is possible to smoothly bias the valve body 11 in the opening direction while minimizing the height of the pressure-reducing valve 1. Furthermore, in the leaf spring 12, a tapered part 12c connecting the outer edge portion 12b and the center portion 12a is formed as follows.

Figure 2:
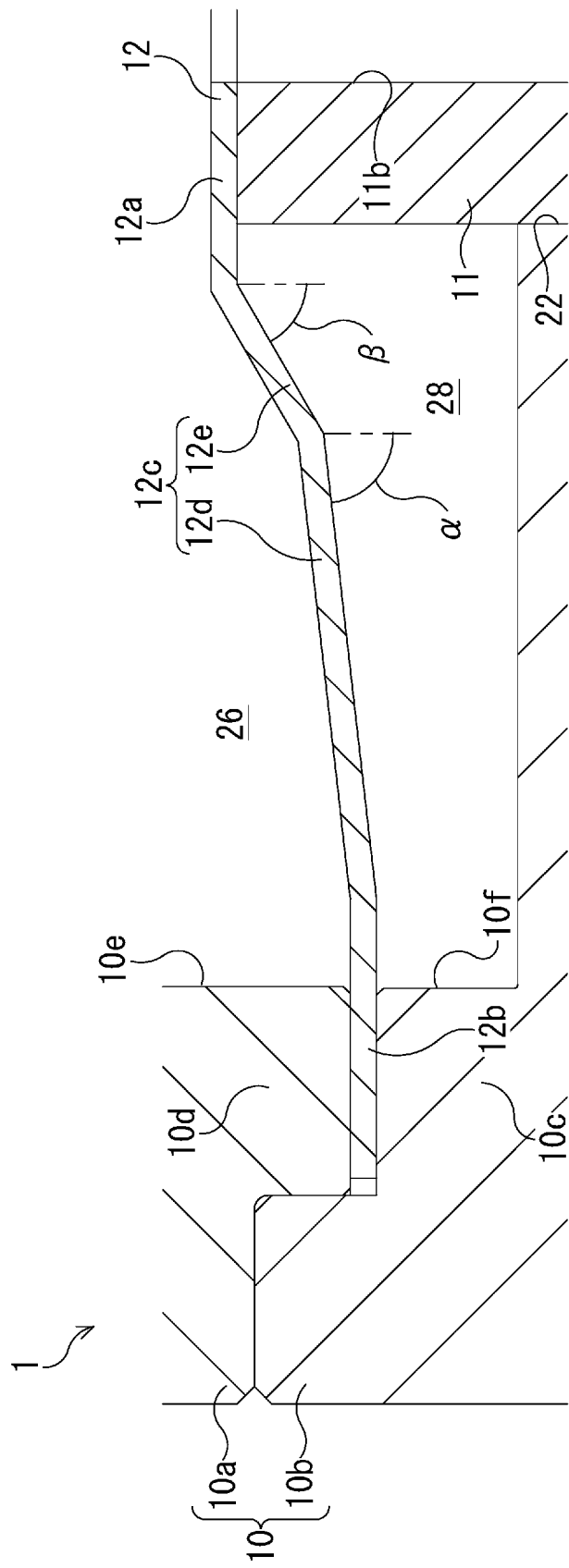
FIG. 2 is an enlarged cross-sectional view of one portion of a leaf spring in the pressure-reducing valve illustrated in FIG. 1.

Specifically, the tapered part 12c is formed to be tapered in shape, as illustrated in FIG. 2. In the present embodiment, the tapered part 12c is formed to be tapered with more than one angle. Specifically, in the tapered part 12c, an outer edge side portion 12d and a center side portion 12e have different taper angles α, β. Specifically, the taper angle β of the center side portion 12e is more acute than the taper angle α of the outer edge side portion 12d. Therefore, the leaf spring 12 has the outer edge thereof sandwiched when the valve body 11 moves in the closing direction. Note that the taper angles α, β can be directly measured, but may be calculated using the angle formed between the outer edge portion 12b (flat portion) and the outer edge side portion 12d and the angle formed between the outer edge portion 12b (flat portion) and the center side portion 12e.

More specifically, when the center portion 12a moves in the other axial direction, the leaf spring 12 bends as follows. The tapered part 12c elastically deforms while changing the relative angle between the outer edge side portion 12d and the center side portion 12e, and moves the center portion 12a in parallel. Therefore, the leaf spring 12 can move the valve body 11 substantially straight down in the closing direction and prevent the axis shift of the valve body 11 (the inclination of the valve body 11), thereby reducing partial contact of the valve body 11 in the valve chamber 22 during the movement of the valve body 11 in the closing direction. Furthermore, when the tapered part 12c is formed, warping of the leaf spring 12 can be reduced. Thus, the valve body 11 can be kept from becoming detached from the leaf spring 12. Note that in the tapered part 12c, the outer edge side portion 12d and the center side portion 12e do not necessarily need to have different taper angles and may be formed at a single taper angle.

Figure 3:
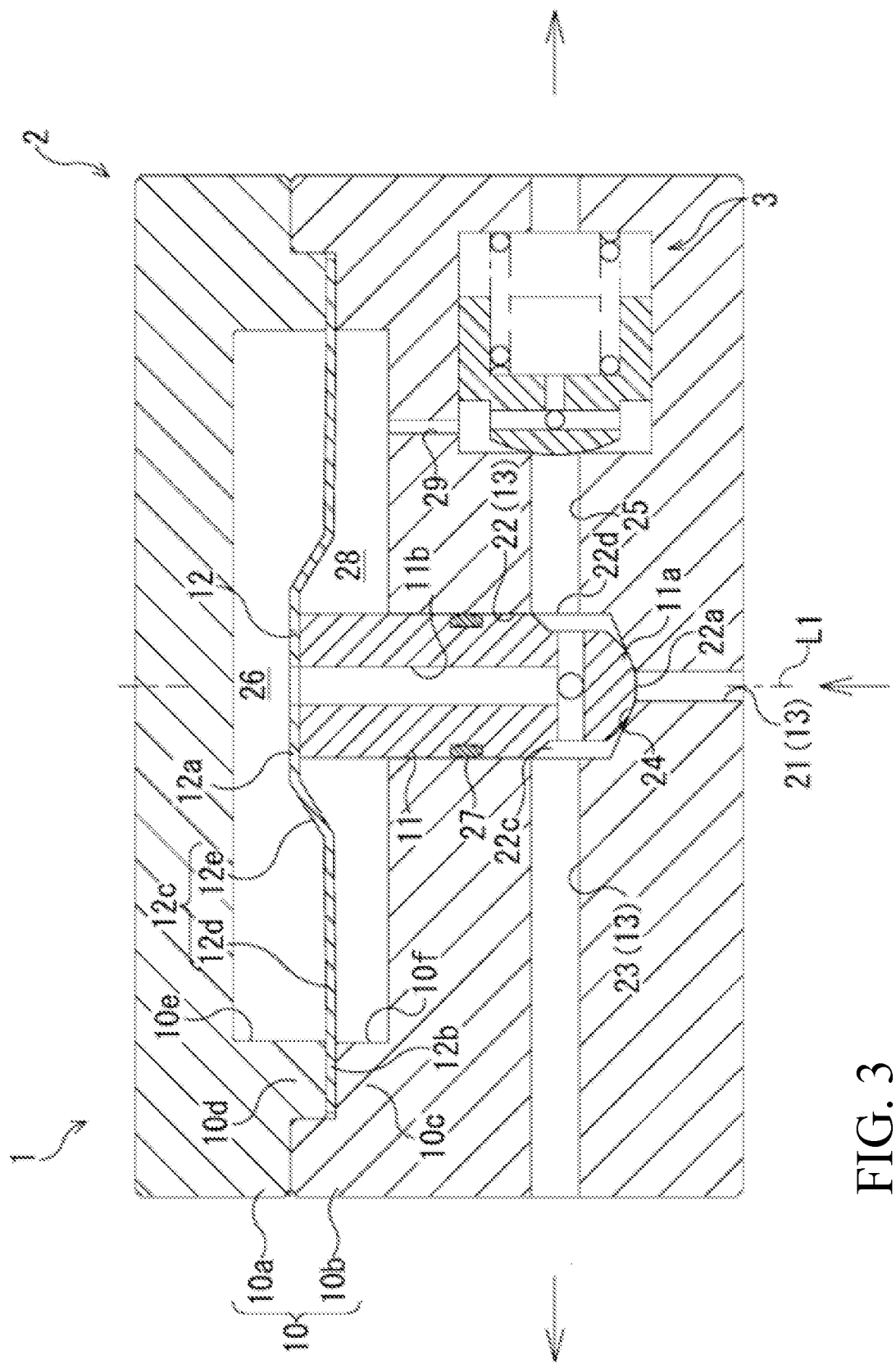
FIG. 3 is a cross-sectional view illustrating the pressure-reducing valve illustrated in FIG. 1 with a valve body seated on a valve seat.

The portion of the leaf spring 12 that is located inward of the outer edge portion 12b protrudes from the step part 10c to the recess 10f. Thus, it is possible to secure space for the leaf spring 12 to bend when the center portion 12a moves in the closing direction. Specifically, the portion inward of the outer edge portion 12b is allowed to bend toward the recess 10f (downward on the drawing sheet of FIG. 1), and the leaf spring 12 is allowed to deform until the outer edge side portion 12d of the tapered part 12c becomes substantially flush with the outer edge portion 12b. Therefore, it is possible to further minimize the height of the leaf spring 12 in the pressure-reducing valve 1 by designing the leaf spring 12 such that when the valve body 11 is seated on the valve seat part 24, the outer edge side portion 12d is substantially flush with the outer edge portion 12b, as illustrated in FIG. 3.

Furthermore, in the pressure-reducing valve 1, a relief port 22d is formed in the inner peripheral surface of the valve chamber 22. In the present embodiment, the relief port 22d is formed in a position in which the opening of the secondary-side passage 23 is reflected across the axial line L1. A relief passage 25 is connected to the relief port 22d. The relief passage 25 extends orthogonally to the axial line L1. The relief valve 3 is integrally provided in the casing 10, and the relief passage 25 is connected to the atmosphere via the relief valve 3. When the secondary pressure at the pressure-reducing valve 1 exceeds a predetermined set pressure, the relief valve 3 drains the secondary pressure to the atmosphere and the like. When the relief port 22d is formed in the inner peripheral surface of the valve chamber 22 as just described, the relief valve 3 can be disposed laterally to the valve body 11. This makes it possible to minimize the axial length of the valve unit 2.

Furthermore, in the valve unit 2, an open passage 29 is formed in the casing 10. The open passage 29 allows communication between space on the secondary side of the relief valve 3 and the atmosphere chamber 28. More specifically, the atmosphere chamber 28 is isolated from the secondary chamber 26 by the leaf spring 12, and is also isolated from the annular passage 22c by the sealing member 27. The open passage 29 allows the atmosphere chamber 28 to communicate with the space on the secondary side of the relief valve 3. Therefore, even when the leaf spring 12 deforms and the volume of the atmosphere chamber 28 changes or when gas leaks into the atmosphere chamber 28, the atmosphere chamber 28 can be maintained at the atmospheric pressure. Furthermore, when the secondary pressure exceeds the set pressure and the relief valve 3 opens the relief passage 25, a relief pressure which is the pressure on the secondary side of the relief valve 3 is brought to the atmosphere chamber 28 through the open passage 29. Thus, it is possible to exert the relief pressure on the leaf spring 12 against the secondary pressure. Therefore, it is possible to reduce load that acts on the leaf spring 12 when the relief valve 3 is actuated.

In the pressure-reducing valve 1 configured as described above, the leaf spring 12 extends radially outward, in other words, laterally, from the valve body 11. Therefore, the axial length of the pressure-reducing valve 1 can be set less than that of a conventional pressure-reducing valve; in other words, the pressure-reducing valve 1 can be downsized. Furthermore, in the pressure-reducing valve 1, the leaf spring 12 has a pressure-receiving function as mentioned above, and thus the valve body 11 can be downsized and the number of components in the valve body 11 can be reduced. Moreover, since the leaf spring 12 also has a sealing function, the number of components can be further reduced. Accordingly, the pressure-reducing valve 1 can be downsized. Furthermore, by using the leaf spring 12 as a seal, it is possible to reduce the number of slidable sealing members to be provided on the valve body 11. This allows a reduction in sliding friction that acts on the valve body. Furthermore, by using the leaf spring 12 as a seal, it is possible to reduce the sliding friction. Moreover, in the pressure-reducing valve 1, since the valve body 11 is formed of a resin member, the number of components can be small and it is easy to manufacture the valve body 11, as compared to a pressure-reducing valve in which a portion to be seated on the valve seat part 24 and the remaining portion are formed separately. Thus, the manufacturing cost of the pressure-reducing valve 1 can be reduced.

Other Embodiments

Although the present embodiment has described the case where the leaf spring 12 is applied to the pressure-reducing valve 1, the valve device to which the leaf spring 12 is applied is not limited to the pressure-reducing valve 1. For example, the valve device may be replaced by an on-off valve, a relief valve, or the like; it is sufficient that the valve device bias the valve body in the opening or closing direction against gas pressures such as the primary pressure and the secondary pressure. Furthermore, the leaf spring 12 does not necessarily need to be attached to the end surface of the valve body 11 and may be attached to the side surface of the valve body 11 and moreover, the shape of the leaf spring 12 is not limited to the shape described above as long as the leaf spring 12 is in the form of a plate (for example, in the shape of a rectangle) extending laterally from the valve body 11. Furthermore, the leaf spring 12 does not even necessarily need to have the pressure-receiving function or the sealing function, which may be achieved by the valve body 11 or another member. Specifically, a pressure-receiving part may be formed on the valve body 11 or an O-ring or a diaphragm may be used to achieve sealing.

Figure 4:
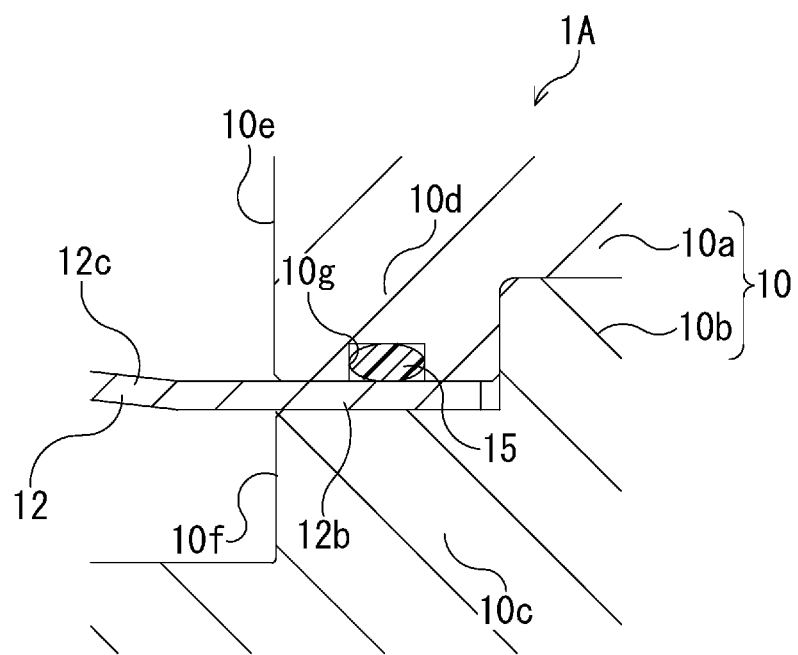
FIG. 4 is an enlarged cross-sectional view of a portion of a pressure-reducing valve according to another embodiment that corresponds to a region X indicated in FIG. 1.

Furthermore, sealing may be achieved using an O-ring 15 as in a pressure-reducing valve 1A illustrated in FIG. 4. Specifically, a recess 10g having an annular form is formed in the annular protruding part 10d, the O-ring 15 fits into the recess 10g, and the outer edge of the leaf spring 12 is sandwiched between the step part 10c and the annular protruding part 10d together with the O-ring 15. With this, the sealing properties can be further improved.

Furthermore, the shape of the valve passage 13 is also not limited to the shape described above. For example, the secondary-side passage 23 may be connected to the secondary chamber 26. Furthermore, the position of the relief valve 3 is also not limited to the position described above and may be connected to the secondary-side passage 23. Furthermore, the communication path 11b illustrated in FIG. 1 does not necessarily need to be formed in the valve body 11 in order to bring the secondary pressure to the secondary chamber 26. For example, a passage connecting the secondary-side passage 23 (or the annular passage 22c) and the secondary chamber 26 may be formed in the casing 10. The secondary-side passage 23 may be connected to the secondary chamber 26 via a passage and external piping. Furthermore, the open passage 29 does not necessarily need to be connected to the relief valve 3. This means that the open passage 29 may be directly exposed to the atmosphere.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

| REFERENCE CHARACTERS LIST | |
|---|---|
| 1 | pressure-reducing valve (valve device) |
| 2 | valve unit |
| 3 | relief valve |
| 10 | casing |
| 11 | valve body |
| 12 | leaf spring (biasing member) |
| 12a | center portion |
| 12b | outer edge portion |
| 12c | tapered part |
| 12d | outer edge side portion |
| 12e | center side portion |
| 13 | valve passage |
| 22 | valve chamber |
| 22d | relief port |
| 26 | secondary chamber |
| 28 | atmosphere chamber |

The invention claimed is:
1. A pressure-reducing valve comprising:
a casing in which a valve passage is formed;
a valve body that is movably housed in the casing, receives a primary pressure in an opening direction in which the valve passage opens, and changes a position thereof according to a secondary pressure to adjust an opening degree of the valve passage; and a biasing member that receives the secondary pressure, moves the valve body to a position corresponding to the secondary pressure received, and biases the valve body against the secondary pressure in the opening direction, wherein:

the biasing member is a spring in the shape of a circular disc and extends laterally from the valve body.

2. The pressure-reducing valve according to claim 1, wherein:

the casing includes a secondary chamber into which the secondary pressure is brought, and the biasing member covers the secondary chamber and receives the secondary pressure brought to the secondary chamber.

3. The pressure-reducing valve according to claim 1, wherein:

the biasing member is a metal member; and the valve body is a resin member.

4. The pressure-reducing valve according to claim 1, wherein:

the biasing member protrudes in the opening direction.

5. The pressure-reducing valve according to claim 4, wherein:

the biasing member includes a tapered part that is tapered in shape and connects an outer edge portion and a center portion, the outer edge portion being supported by the casing, the center portion being a portion to which the valve body is attached.

6. The pressure-reducing valve according to claim 5, wherein:

the tapered part is formed to cause a center side portion thereof to form a more acute angle than an outer edge side portion thereof.

7. The pressure-reducing valve according to claim 1, wherein:

in the casing, a relief port that relieves the secondary pressure is formed; and the relief port is formed laterally to the valve body in the casing.

8. A valve unit comprising:

the pressure-reducing valve according to claim 1; and a relief valve that relieves the secondary pressure at the pressure-reducing valve, wherein:

in the pressure-reducing valve, an atmosphere chamber isolated from the secondary chamber and the valve passage is formed on an opposite side of the biasing member from the secondary chamber in the casing; and the atmosphere chamber is exposed to an atmosphere via a secondary-side passage of the relief valve.

9. A pressure-reducing valve comprising:

a casing including a valve passage, a valve chamber, and a secondary chamber into which a secondary pressure is brought;

a valve body that is movably housed in the valve chamber and changes a position thereof according to the secondary pressure to adjust an opening degree of the valve passage; and a biasing member that biases the valve body against the secondary pressure in an opening direction in which the valve passage opens, wherein:

the biasing member is a spring in the form of a plate, extends laterally from the valve body, and is provided in the casing to seal the secondary chamber.

\* \* \* \* \*